United States Patent [19]
Grady

[11] Patent Number: 5,203,742
[45] Date of Patent: Apr. 20, 1993

[54] PUNCH FOR MAKING SUCH SCREW HEADS WITH SLANT RIB

[75] Inventor: John H. Grady, Wayland, Mass.

[73] Assignee: Phillips Screw Company, Burlington, Mass.

[21] Appl. No.: 820,355

[22] Filed: Jan. 14, 1992

Related U.S. Application Data

[63] Continuation-in-part of Ser. No. 736,094, Jul. 26, 1991, Pat. No. 5,120,173.

[51] Int. Cl.⁵ .............................................. B21K 1/46
[52] U.S. Cl. ......................................................... 470/63
[58] Field of Search .................... 470/60, 63, 137, 150, 470/184, 191, 205; 411/403, 404, 407, 419

[56] References Cited

U.S. PATENT DOCUMENTS

| | | | |
|---|---|---|---|
| 3,108,623 | 10/1963 | Muenchinger | 470/63 |
| 3,120,012 | 2/1964 | Muenchinger | 470/63 |
| 3,238,540 | 3/1966 | Muenchinger | 470/63 |
| 3,858,261 | 1/1975 | Vozumi | 470/63 |
| 3,972,083 | 8/1976 | Dreger | 470/63 |
| 4,151,621 | 5/1979 | Simmons | 470/63 |

Primary Examiner—Lowell A. Larson
Assistant Examiner—Michael J. McKeon
Attorney, Agent, or Firm—Hayes, Soloway, Hennessey & Hage

[57] ABSTRACT

A punch is provided for making a screw head with ribs on some of the driver surfaces. The punch includes a slanted groove for providing a rib which is slanted from the screw axis by a small angle between 1° and 10°.

5 Claims, 3 Drawing Sheets

PUNCH FOR MAKING SUCH SCREW HEADS WITH SLANT RIB

BACKGROUND OF THE INVENTION

The present invention relates to screw heads of the type described in U.S. Pat. No. 4,084,478 dated Apr. 18, 1978, as generally shown in FIGS. 2 and 3 thereof. This application is in part a continuation of co-pending application Ser. No. 07/736,094 filed Jul. 26, 1991 now U.S. Pat. No. 5,120,173, issued Jul. 9, 1992. Such screw heads are provided with ribs on some of the driver-engageable surfaces of the head to interlock with an edge of the driver to reduce the tendency for the driver to slip out of engagement with the screw head during driving and removal.

In producing such ribs with a metal punch, the metal of the screw head tends to flow outwardly from the screw axis as well as axially, and accordingly, may not completely fill in the rib during the head forming operation.

SUMMARY OF THE INVENTION

In the present invention, this problem of incomplete filling of the rib is improved by slanting the rib outwardly from the screw axis by a small angle between 1° and 10°, preferably about 1° to 6°, to match the angle of flow of the metal. Another requirement of the invention is that the apex angle of the rib, as measured normal to the slant rib angle, is sufficiently large that the rib will not interfere with the withdrawal of the punch from the formed screw head.

DETAILED DESCRIPTION OF THE INVENTION

In order to more fully understand the invention, reference should be had to the following non-limiting detailed description together in connection with the following drawings wherein:

FIGS. 1, 2 and 3 are taken from U.S. Pat. No. 4,084,478.

Figure 1:
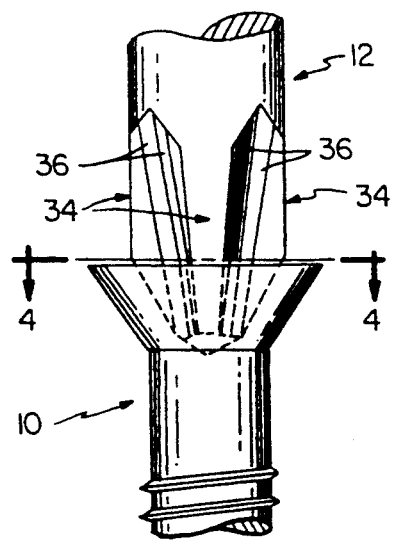
Figure 2:
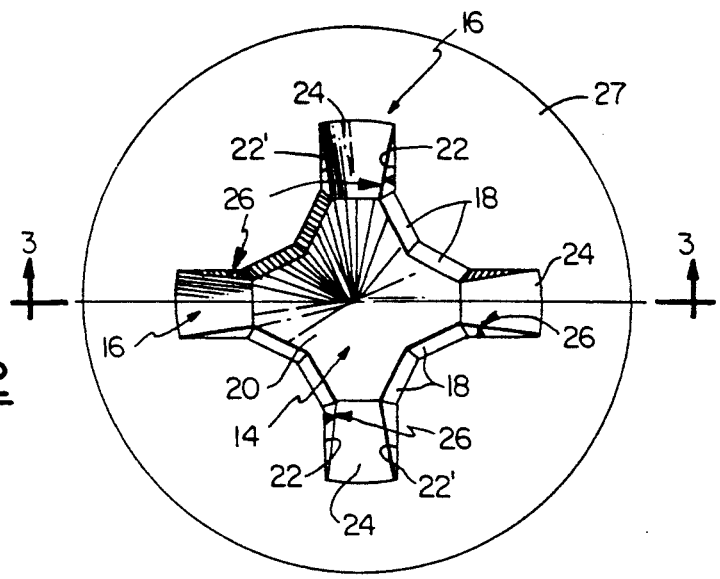

To fully appreciate the present invention, reference should be had to earlier U.S. Pat. No. 4,084,478 of Apr. 18, 1978, which is owned by the assignee of the present application. As mentioned above, FIGS. 1,2 and 3 are directly taken from this '478 patent to avoid unnecessary repetition of the teachings in the '478 patent. All of the disclosure of the '478 patent is pertinent to the present invention.

Figure 3:
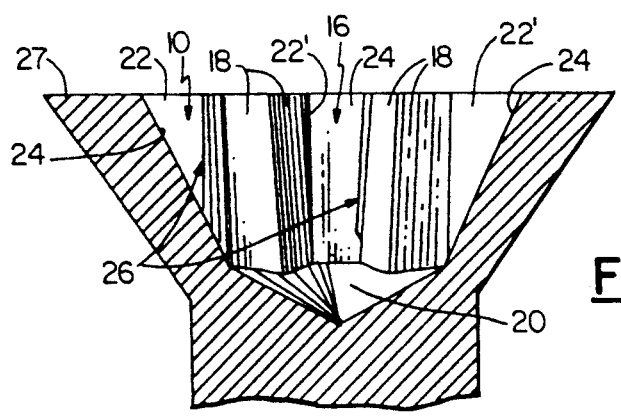
FIG. 3a is a view similar to FIG. 3 showing the slant applied to the rib in accordance with the present invention.
FIG. 3b is like FIG. 3 of '478 showing the wing angle B, which is the angle by which the side wall deviates from the centerline plane of the wing as well as the location of section line c—c.
Figure 3A:
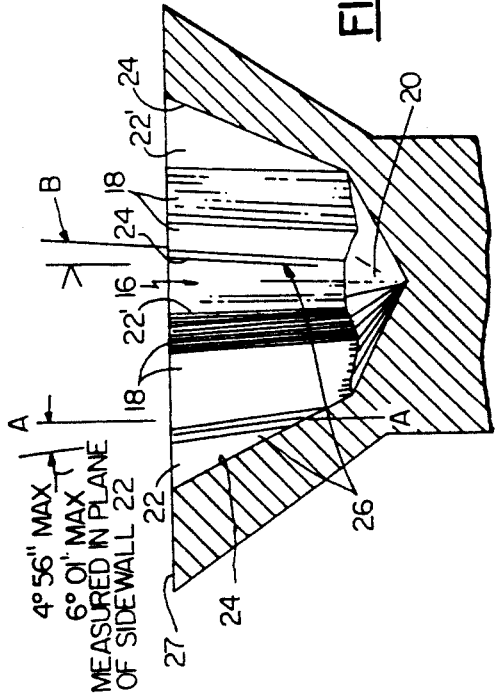

Referring now to FIG. 3a, this is a view similar to FIG. 3 except it shows the slant angle A by which the apex of the rib deviates from a line parallel to the screw head axis. In FIG. 3a, for purposes of illustration, this angle A has been exaggerated. It must be, in actual practicing, between 1° and 10° preferably about 1° to 6° to match the angle of flow of the metal. The exact angle can readily be determined by appropriate experiments and will be a function of the size of the wing slots, the depth of the screw head, flow characteristics of the metal, temperature of forming, etc.

Since the punch which forms this slant rib must be withdrawn from the formed screw in a direction parallel to the axis of the screw, the formed rib must not interfere with the withdrawal of the punch. To provide this, the rib is provided with an apex angle which is quite large, preferably greater than 90°.

Figure 4:
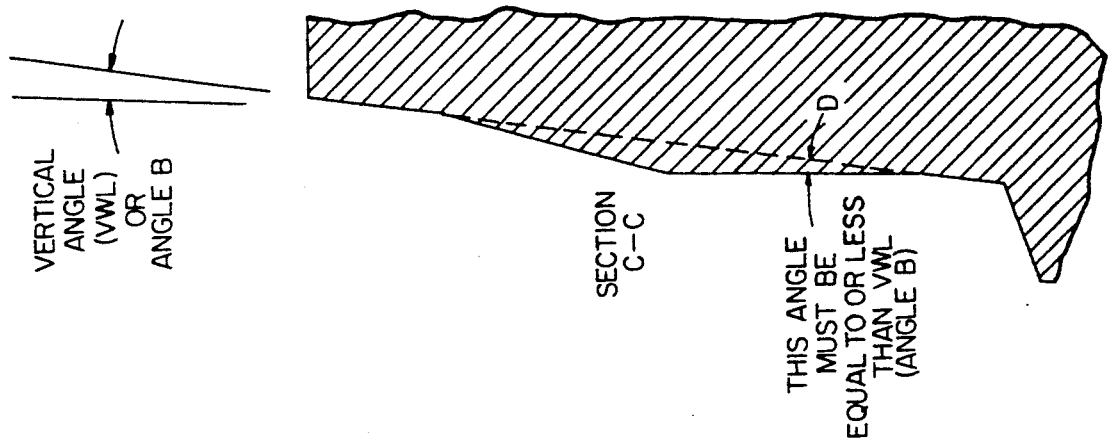
FIG. 4 is an enlarged sectional view taken along line c—c in FIG. 3b to show angle D which is referred to as the base angle.

To appreciate this relationship, reference should be had to FIG. 4, wherein the surface of the rib, as seen along a section line c—c which is parallel to the axis, will have a base angle D with respect to the vertical wing angle. This base angle D must be less than the vertical wing angle. Thus, any die punch surface which engages the surface of the rib can pass in a vertical direction over this cross section without interference.

Figure 3B:
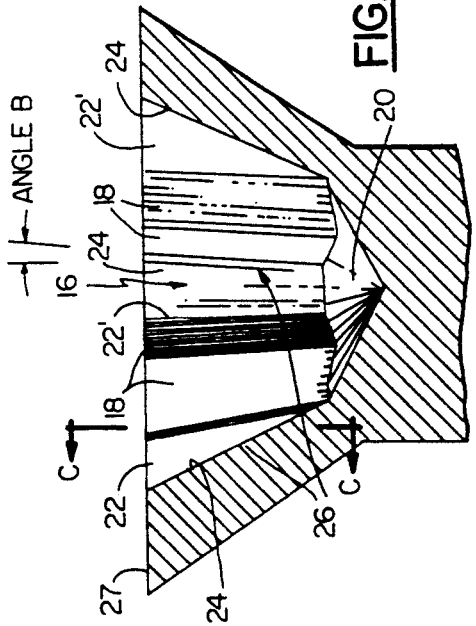

For convenience in this specification the angle D is referred to as the base angle and the angle B is referred to as the wing angle. As can be seen by examining FIG. 3b and FIG. 4, if the apex angle is small, a sectional plane parallel to the axis through the rib will show an increased angle D and the punch will not be able to release after the screw head has been formed.

In most commercial screws, the wing angle is on the order of 4° to 5°. With a rib slant angle of 1° to 6°, an apex angle of 90° or more will result in a base angle D of less than the wing angle. If the apex angle is on the order of 70°, and the slant angle is 12°, the base angle will be 16° which is greater than the wing angle. In this case, the punch could not be withdrawn. Thus, it will be clear to one normally skilled in the art that there are several critical points to the invention.

The slant rib angle should be between 1° and 10°, preferably between about 1° to 6°, to match the flow angle of the metal. The apex angle of the rib, as measured normal to the rib, should be sufficiently large, preferably greater than about 95° depending upon the vertical wing angle B of the driver-engageable surface. As the wing angle B becomes larger, the apex angle can become smaller. As the wing angle becomes smaller, then the apex angle must be larger. In any case, the base angle D created by a section through the rib surface and measured to the vertical wing surface must be less than the vertical wing angle.

While one specific embodiment of the invention has been described above, the basic principles can be applied to all of the ribs (including tapered ribs) in the screw head shown in the '478 patent except where the wing angle is 0° (e.g. FIG. 39 of the '478 patent). In this connection, reference should be had to FIG. 38 which apparently shows a slight deviation of the rib 76. However this rib lies within a substantially vertical plane. This rib 76 is not a slant rib as defined in the present invention. The rib edge of the present invention is slanted with respect to the screw axis and accordingly lies in a plane that is not parallel to the screw axis.

Figure 5:
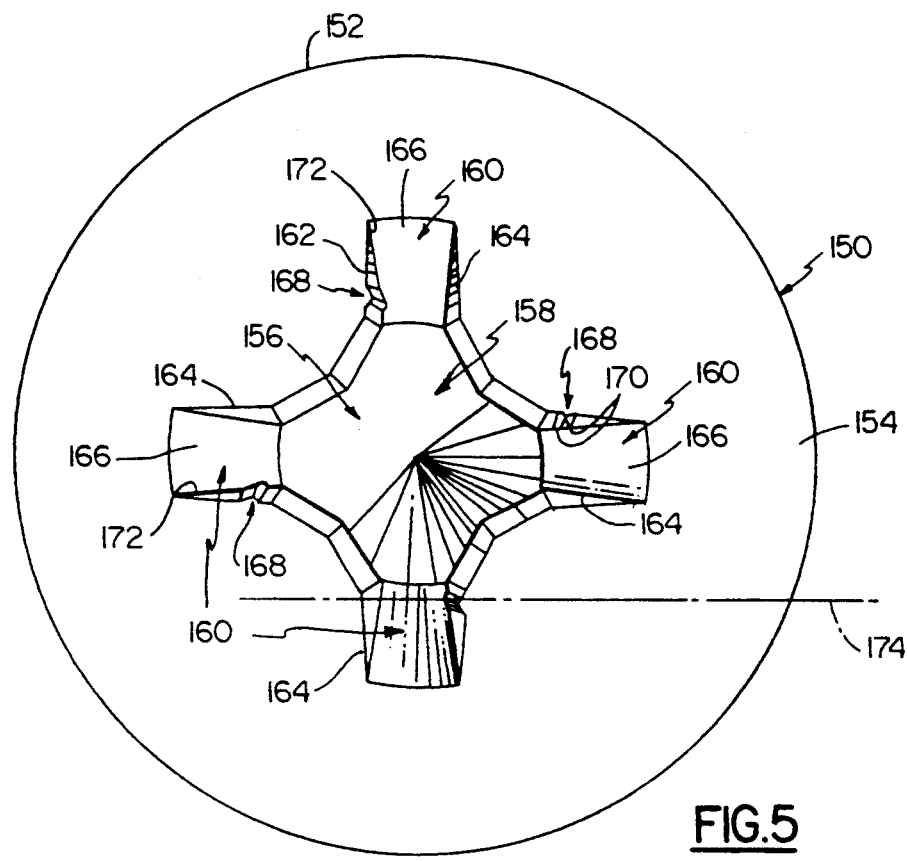
Figure 6:
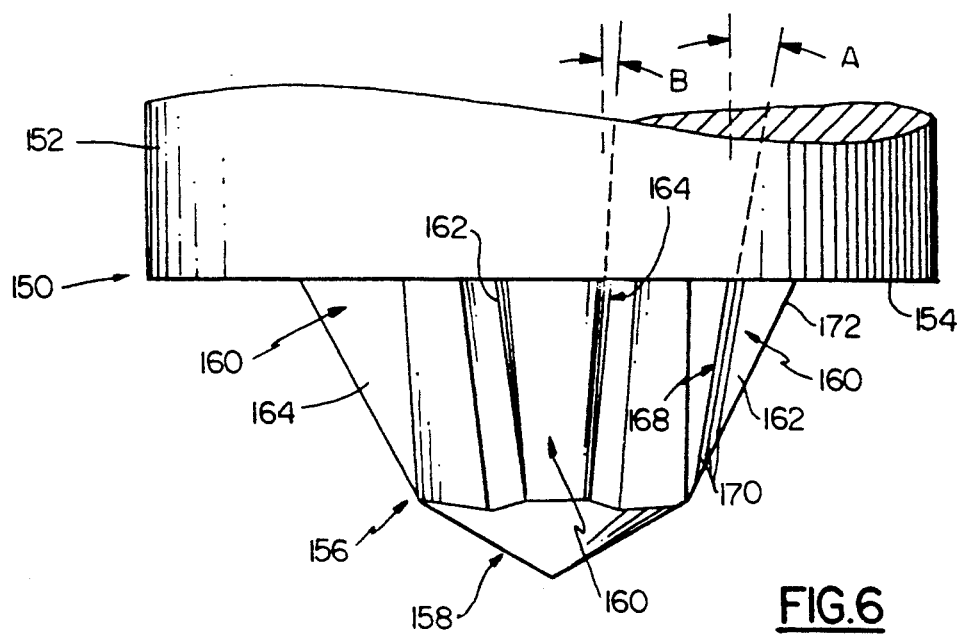

The rib configurations described above may be formed by conventional techniques in commercially employed heading machines. FIGS. 5 and 6 illustrate a punch of a configuration which is adapted to form the rib shown in FIGS. 3A and 3B. These FIGS. 5 and 6 are similar to FIGS. 58 and 59 of U.S. Pat. No. 4,151,621 but have been modified to illustrate the present invention. The punch, indicated generally by the reference character 150, may be formed in accordance with conventional punch forming techniques but modified to include the present invention. The punch 150 includes a body portion 152 having a face 154 and an integral nib 156 which protrudes from the face 154. The nib 156 is the complement of the shape of the recess and the face 154 of the punch 150 is of complementary shape to that of the intended screw head, here described for purposes of illustration as a flat head. The nib 156 includes a central core 158 and a plurality of blades 160 which extend generally radially and outwardly from the core. Each of the blades 160 has a pair of side surfaces 162, 164 and an end surface 166 which is inclined upwardly and outwardly from the outer region of the core 158. The blades 160 at their upper ends, merge into the face 154 of the punch to define an integral structure. A number of the surfaces 162 and/or 164 of the blades are provided with grooves 168 which are defined by groove sidewalls 170. The grooves define a cross-sectional area and configuration substantially identical to that of the rib 26 which is to be formed on the sidewall of the recess groove. Thus, the grooves 168 are of the order of a few thousandths of an inch in depth or less and their relative dimensions are exaggerated for clarity in the drawings. The grooves 168 may be formed on one or more of each of the surfaces 162 or, on both of the surfaces 162 and 164 as desired. In the illustrated punch the grooves 168 are formed on the surfaces 162 of several of the blades 160 which will define the drive walls. The grooves 168 extend from the lower edge 172 of the respective blade sidewalls 160 and/or 162, where the sidewalls join the end surfaces 166, and extend upwardly to the extent desired. The grooves may extend fully to the top of the blades 160, where they meet the face 154 of the punch or, may terminate below the juncture of the blade 160 and face 154 depending on the rib configuration which is to be fabricated. Each of the grooves is formed so that it has a triangular cross-section, the apex of the triangle forming the rib edge which is engageable by the edge of the driver. The axis of groove 168 is tilted upwardly and outwardly from the punch axis in the direction of metal flow by an angle A with respect to a plane parallel to the punch axis. This angle A (see FIGS. 3A and 6) is between about 1° and 10°. The associated side wall 162 of the punch is slanted outwardly from the punch axis by a small vertical wing angle B (see FIGS. 3A and 6) between 1° and 10°. The groove 168 has an apex angle sufficiently large that a vertical section through the groove (and the formed rib) will provide a base angle D (see FIG. 4) for the groove (and the rib surface) which is equal to or less than the vertical wing angle B, this apex angle being measured in a plane normal to the groove apex.

Since the punch has a surface exactly complementary to the final screw head, the preferred ranges for the slant angle A and the wing angle B are the same as those specified for the screw head.

I claim:

1. In an impact tool for forming drive-engageable surfaces at an end of a rotatable fastener comprising:

a body portion having an axis and having an end region lying along said axis, the end region having primary surfaces constituting side walls which define a primary geometrical shape substantially corresponding to those of the primary drive-engageable surfaces to be formed; and means forming at least one elongate groove of relatively small cross-sectional dimensions in at least one of said primary surfaces of said end region, said groove extending generally longitudinally of said axis, whereby when the end region of said tool is impacted into the material of the rotatable fastener, the primary surfaces of the end region will form said geometrically shaped primary driver-engageable surfaces and said elongate groove will cause metal flow in a predetermined direction to form a projection of relatively small cross-sectional dimension extending from said at least one primary driver-engageable surface;

the improvement wherein the elongate groove has a triangular cross-section, the apex of the triangle forming a rib edge which is engageable by the edge of the driver, the groove being tilted upwardly and outwardly from the punch axis in the direction of metal flow by an angle A (the rib angle) with respect to a plane parallel to the punch axis, said angle A being between about 1° and 10°, the associated side wall of the punch being slanted outwardly from the punch axis by a small vertical wing angle B between 1° and 10°, said groove having an apex angle sufficiently large that a vertical section through said formed rib will provide a base angle D for the rib surface which is equal to or less than the vertical wing angle B, said apex angle being measured in a plane normal to the groove.

2. The punch of claim 1 wherein said angle A is between about 1° and 6°.

3. The punch of claim 1 wherein said angle A is about 3°.

4. The punch of claim 1 wherein said angle A is about 5°.

5. The punch of claim 1 wherein said angle is between 3° and 6°.

* * * * *